350-96.29 SR
OR 3,871,743

United States Patent [11] 3,871,743
Fulenwider [45] Mar. 18, 1975

[54] OPTICAL CROSSPOINT SWITCHING MATRIX FOR AN OPTICAL COMMUNICATIONS SYSTEM

[75] Inventor: John E. Fulenwider, Concord, Mass.

[73] Assignee: GTE Laboratories Incorporated, Waltham, Mass.

[22] Filed: June 4, 1973

[21] Appl. No.: 366,941

[52] U.S. Cl. .......... 350/96 WG, 350/96 C, 350/161
[51] Int. Cl. .......... G02b 5/14
[58] Field of Search .......... 350/96 WG, 96 R, 96 C

[56] References Cited

UNITED STATES PATENTS

| | | | |
|---|---|---|---|
| 3,208,342 | 9/1965 | Nethercot | 350/96 WG |
| 3,589,794 | 6/1971 | Marcatili | 350/96 WG |
| 3,612,653 | 10/1971 | Rajchman | 350/160 R |
| 3,622,792 | 11/1971 | Piccininni | 350/160 R |
| 3,791,715 | 2/1974 | Lean et al. | 350/96 WG |

*Primary Examiner*—John K. Corbin
*Attorney, Agent, or Firm*—Irving M. Kriegsman; Bernard L. Sweeney

[57] ABSTRACT

An optical crosspoint switching matrix comprising an array of several stages of subswitches. Each subswitch includes a number of inlets and outlets of optical channels. Signals conveyed on the optical channels are sequences of "on and off" pulses, grouped in time slots, assigned to the subscribers communicating at that instant. Each subswitch functions to steer the time slot pulses from a given inlet to a particular outlet by acoustical beam steerers using acoustic-optic interaction.

11 Claims, 2 Drawing Figures

OPTICAL CROSSPOINT SWITCHING MATRIX FOR AN OPTICAL COMMUNICATIONS SYSTEM

FIELD OF THE INVENTION

This invention relates generally to an optical switch and more particularly to an optical crosspoint switching matrix for an optical communications system.

BACKGROUND OF THE INVENTION

Demands for wider bandwidth per subscriber channel come from the gradually increasing usage of video telephones, closed circuit television and other broadband communications systems. A recent forecast made for the telephone industry predicts a breakthrough in distribution technology. Optical communications may be the candidate that could fulfill this prediction.

Optical communications, by means of optic fibers, lasers, light-emitting diodes, avalanche detectors, and modulators may become pre-eminent in telecommunications in the next two decades. The promise that this technology brings is wide bandwidth at low cost. Today, unit costs for some of the components are discouragingly high, but with several sectors of the industry showing serious interest in this mode of communications, cost for components should come down drastically. Predictions of cost competitiveness for optical single function devices, plus the arrival of integrated optics within 5 years, make optical communications systems most attractive.

In order to transmit and receive optical signals in a communication system, it is essential that a dependable, compact and economical switching system be developed; therefore, it is an object of the present invention to produce an inexpensive, dependable optical switching system.

A further object of the invention is to use acousto-optic interaction to steer the optical signals in an optical crosspoint switching matrix.

SUMMARY OF THE INVENTION

The present invention relates to an optical switch which may be used in an optical communications system. In optical communications systems, optic fibers are used as transmission lines to carry the optical signals from one subscriber to another. When such optical communications systems are used in a time division multiplex mode of operation, they are capable of carrying wideband information covering a broad spectrum of frequencies. Optical signals arriving at the central office from subscriber stations will be routed to their proper terminations either in the central office, out to another local subscriber, or over a trunk to a distant office. For local-to-local subscriber communications, that is, between two subscribers served by the same central office, an optical path in each direction is established through an optical switching matrix.

For local subscriber-to-outgoing trunk (or vice versa) communications, the subscriber's signals will be modified for conveyance on an optical trunk carrier. Trunking between central offices may be accomplished by using single-mode optic fibers, on which several broadband channels are time-division-multiplexed, and requires mode-locked lasers, modulators, and beam splitters.

The broadband services that are to be provided, such as video programming and data display, FM programming, and computer access, are assumed to have switching port appearances in the central office. Access to these ports by subscribers is possible by the establishment of optical pathways through the switching matrix.

Crosspoints required for switching optical channels are required and may follow the principles of TDM time slot interchange switching. The network is a "space-division" type over which pulse optical signals are switched. Input channels are connected to ports on the switching matrix. The switching matrix consists of an array of several stages of sub-switches. Each subswitch has a number of inlets and outlets.

Inlets and outlets of the subswitch consist of a number of ports providing access to light propagating channels. Signals conveyed on the optical channels are sequences of "on and off" pulses, grouped in time slots, assigned to the subscribers communicating at that instant. Any subswitch functions to steer the time-slot pulses from a given inlet to a particular outlet. This may be accomplished by using the principle of acousto-optic interaction resulting from the use of acoustic beam steerers. Here, a light beam is brought into the switch in one horizontal path along the longitudinal axis of the channel. When it reaches the appropriate (activated) acoustic switch crosspoint, the acoustic signal applied to it, acting as an optical interaction grating, causes the light beam to bend. Instead of passing straight through on the horizontal, it is diverted to one of the verticals. The vertical path communicates with the outlet port of the subswitch; this signal may be connected to an inlet port of a similarly constructed switch in the second stage or rank of switches. Following this type of topology, the acoustic switch crosspoints, arranged in rows and columns, make up the switching array. Time delays are introduced as necessary to align the pulse with the proper time slots. Control signals for selecting and operating the acoustic switch crosspoints may come from a mini-processor using standard computer control techniques.

The features of the present invention which are believed to be novel are set forth with particularity in the attendant claims. The invention, together with further objects and advantages thereof, may best be understood by reference to the following description taken in connection with the drawings. In the several figures, like reference numerals identify like elements.

DESCRIPTION OF THE PREFERRED EMBODIMENT

Figure 1:
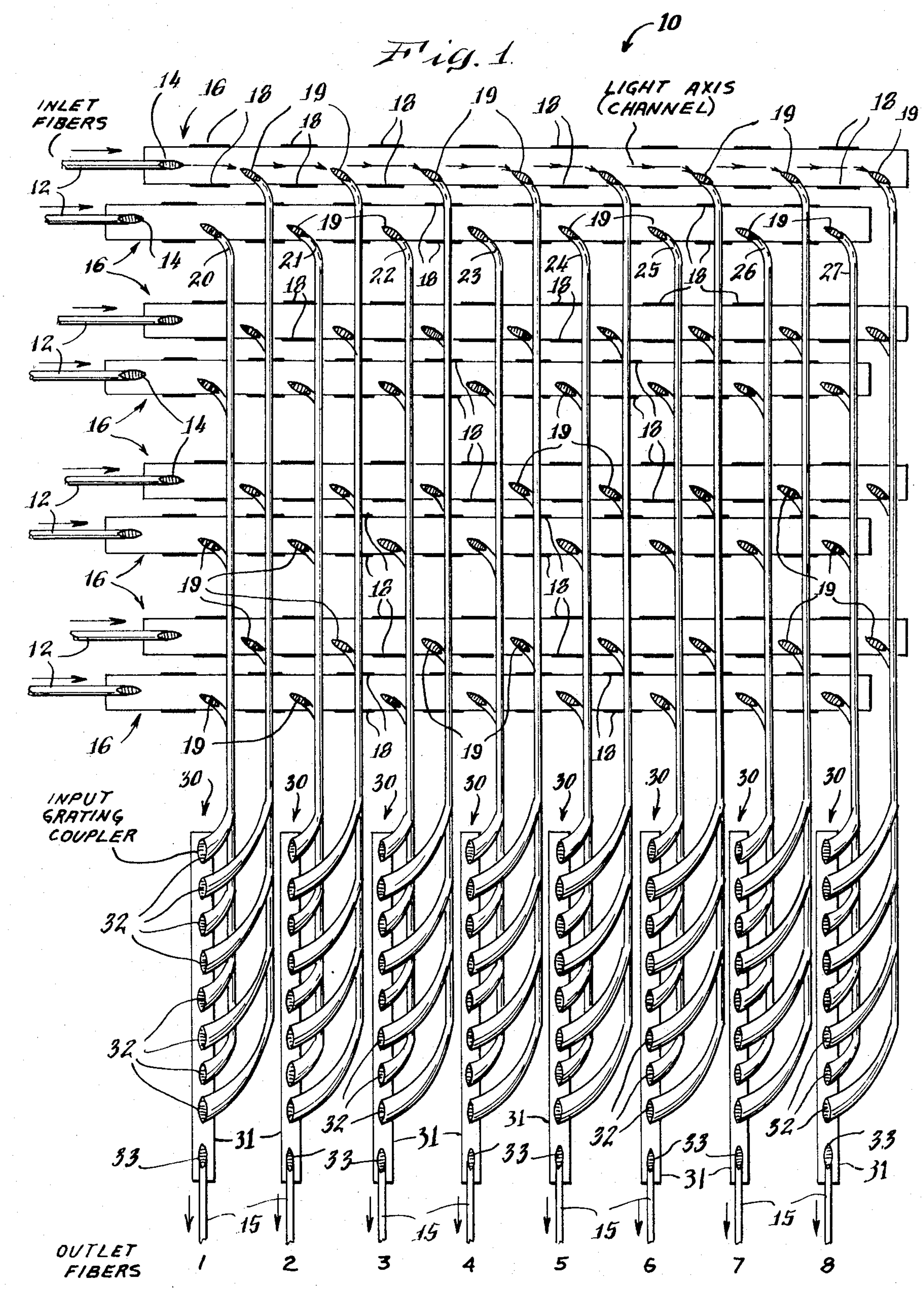
FIG. 1 is a diagrammatic representation of an optical switching matrix according to the present invention.

Attention is now directed to FIG. 1 which illustrates an optical crosspoint switching matrix in accordance with the present invention. For simplicity, only an 8 × 8 matrix or subswitch is shown, but it will be evident from the following detailed description that the description is applicable to any M × N matrices. The matrix 10 has eight horizontal input optical fibers and eight vertical output optical fibers, collectively numerically identified as 12 and 15, respectively. The input optical fibers carry the optical signals from a local subscriber's station to a central location such as a central office where the matrix 10 is located. Optical signals arriving at the central office from local subscribers' stations are routed to their proper terminations either at the central office, out to another subscriber, or over a trunk to adjacent offices. For local-to-local subscriber communications—that is, between two subscribers served by the same central office, an optical path is established from the incoming optical fiber 12 to the outgoing optical fiber 15 through the optical switching matrix 10.

Each input fiber 12 is coupled by an input grating 14 to an inlet port of an optical light propagating switching channel 16 dedicated to a subscriber. Each channel 16 is made of light-conducting material for propagating the optical input signal along the longitudinal axis of the channel until it is steered or bent to a particular outlet port. This steering or bending may be accomplished by an acousto-optic interaction, resulting from acoustic beam steerers 18. The method and apparatus used for steering the beam is discussed in more detail hereinafter. At the eight channel outlet ports the signal is coupled by eight output gratings 19 to eight vertical coupling optical fibers 20, 21, 22, 23, 24, 25, 26 and 27. One coupling fiber per channel is dedicated to the use of a single subscriber. Therefore, in the present example, there is a set of eight coupling fibers for each of the eight subscribers served by matrix 10.

Each set of eight coupling fibers are connected to an optical adder substage 30 dedicated to each subscriber. The adder 30 comprises an optical light propagating adder channel 31 having eight inlet ports and one outlet port, eight input gratings 32 and an output grating 33.

The adder channel 31 has a longitudinal light propagating axis which is constructed of a light propagating medium such as a light conductive film deposited on a supporting substrate. The input signal carried by any one of the set of coupling fibers is optically coupled to the propagating medium by an input grating 32 at the inlet port. The channel is constructed such that any signal appearing at any inlet port is propagated along the longitudinal axis toward the outlet port. At the inlet port the signal is optically coupled to the propagating medium by an input grating 32 at the inlet port. At the outlet port the signal is optically coupled to outlet fiber 15 by the output grating 33. The adder substage therefore allows any signal appearing on any one of the set of eight coupling fibers to be transmitted to the subscriber via a single output fiber 15.

Figure 2:
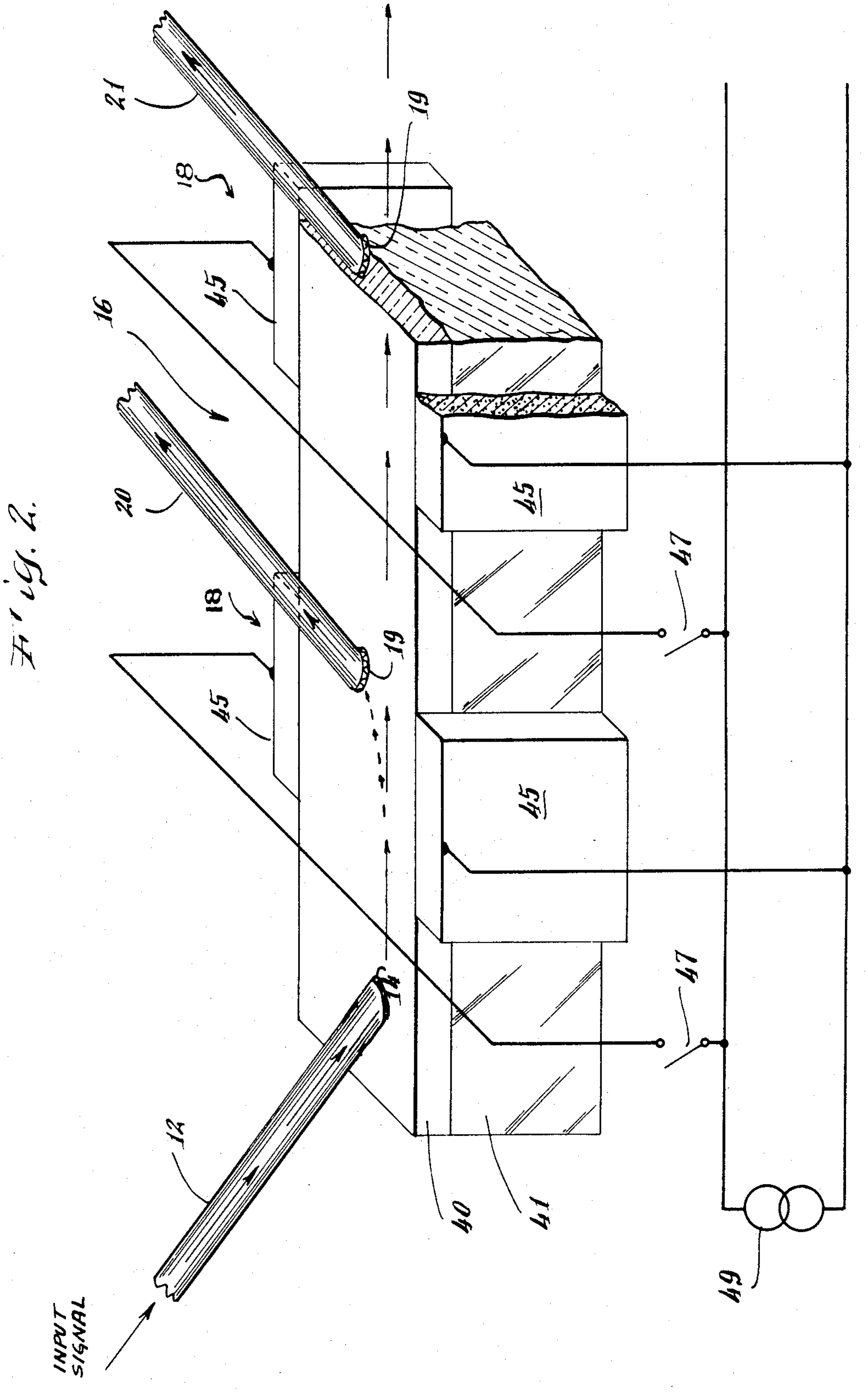
FIG. 2 is a perspective view with parts broken away of a portion of the switch shown in FIG. 1.

Attention is now directed to FIG. 2 which illustrates the switching channel 16 and the beam steerers 18 used to direct the optical signal propagating down the longitudinal axis of the optical channel 16. An expanded segment of channel 16 is shown comprising a light conductive film 40 made of silicon dioxide ($SiO_2$) or methyl methacrylate (lucite) or sputtered glass. The film is deposited on a substrate 41 for mechanical strength and support. The substrate 41 is preferably constructed of material such as glass, the index of refraction of which is less than that of the film, so that the light will be confined to the film 40. The input optical fiber 12 is shown bias terminated and in contact with the input diffraction grating 14 which optically couples the input light signal appearing at the inlet port to the longitudinal propagating axis of channel 16. Each coupling fiber such as 20 and 21 is also bias terminated and optically coupled to the channel at an outlet port by an output diffraction grating 19.

Associated with the outlet ports is an electromechanical beam steerer 18, as shown in FIG. 1. The beam steerer comprises a set of longitudinal wave transducers 45 which may be fabricated from piezoelectric material such as lead-zirconatetitanate (PZT) or lithium niobate or quartz. Each set of transducers has an associated semiconductor switch or relay 47 which permits an oscillatory electrical signal from a signal generator 49 to excite a set of transducers and deflect the optical signal to the outlet port. Control signals to activate the appropriate semiconductor switch, or relay may come from a mini-processor using conventional computer control techniques.

In operation of an optical communications system, an optical time division multiplexed signal originates at the subscriber station as a sequence of "on and off" pulses of light, grouped in time slots, assigned to the subscribers communicating at that instant, and is transmitted to a central switching center via an optical fiber. At the center, the signal is guided through an optical crosspoint switch, for example, if the signal is to be received by another local subscriber. The optical fiber is terminated and the signal coupled at an inlet port of an optical light propagating channel which is dedicated to each subscriber. The coupling is accomplished by using a diffraction grating which inserts the signal along the longitudinal axis of the channel. The optical signal (photons) propagates along the longitudinal axis of the channel until interrupted at the appropriate (activated) switch crosspoint by acoustic signal (phonons) induced in the light propagating medium of the channel by an acoustic signal generated by an electro-mechanical transducer.

The acoustic signal (phonons) may be established in the propagating medium of the optical channel by a set of electro-acoustic transducers (using piezoelectric effect) arranged on both sides of the outlet port. These transducers are excited by an oscillatory electrical signal from a central signal generator. The signal is switched to the proper transducer by logic and interface circuits which have been activated by the address message previously generated by the sender similar to conventional telephone systems. The acoustic signal (phonons) causes the light beam to bend toward an outlet port by the principle of phonon-photon interaction (acousto-optic interaction) rather than passing straight along the longitudinal axis of the channel. The action of phonon-photon interaction under conservation of momentum laws causes the photon stream to be bent from a straight line path. Another way of interpreting the interaction is that the acoustic signal creates a diffraction grating with period equal to the acoustic wavelength in the channel material, and the light beam is bent by passing through the grating. Bending follows the law $$\mathrm{SIN}\theta = (\lambda\ \mathrm{optic}/\lambda\ \mathrm{acoustic})$$

where $\theta$ is the angle of bending from a straight line.

After the deflected signal enters the proper outlet port in the channel, the signal is inserted into a coupling fiber with an output diffraction grating located at the outlet port. The signal then passes through the coupling fiber and is inserted into an optical adder channel with an input diffraction grating. An optical adder is dedicated to a single subscriber and permits the interconnection of a signal carried on any coupling fiber from each of the dedicated optical light switching channels to an output fiber for transmission to the receiving subscriber. The adder therefore comprises an optical channel with a number of inlet ports and one outlet port. After the signal enters the adder channel, it propagates along the light propagating axis to the end and out the outlet port. The outlet port is connected by an output diffraction grating which couples the signal at the outlet port to the output fiber for transmission to the receiving subscriber.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

What is claimed is:

1. An optical switch for an optical communications system comprising:

a thin film light propagating channel formed on a supporting substrate of lower refractive index and having a longitudinal axis, an inlet port thereon adapted to be optically coupled to an external input signal of light, and a plurality of outlet ports also formed on the substrate and spaced one from another along said longitudinal axis and joined directly to the thin film light propagating channel and to a plurality of coupling fibers, said channel propagating said input signal along said longitudinal axis; and switching means for interconnecting said input signal to any selected one of said outlet ports, said switching means including a means for optically steering the input signal from said longitudinal axis toward the selected one of said outlet ports, whereby any input signal may be switched through any selected outlet port for transmission.

2. An optical switch in accordance with claim 1 wherein the steering means includes a pair of electro-acoustic transducers located at said outlet ports for diffracting the input signal by phonon-photon interaction taking place within said light propagating channel.

3. An optical switch according to claim 2 wherein said electro-acoustic transducers are electro-mechanical and each transducer is electrically coupled to logic and control circuits and an oscillatory voltage source.

4. An optical switch in accordance with claim 1 wherein the light conducting film is selected from the group consisting of silicon dioxide, methyl methacrylate or sputtered glass.

5. A crosspoint switching matrix for an optical communications system comprising:

a plurality of light propagating channels, each channel having a longitudinal axis, an inlet port, and a plurality of outlet ports spaced one from another along said longitudinal axis, said inlet port being adapted to receive an external optical input signal, said channel propagating said input signal along said longitudinal axis;

first means for optically steering said input signal to an outlet port;

a plurality of light-conducting fibers, one end of each fiber is optically coupled to one of said outlet ports;

switching means for actuating said steering means to interconnect said input signal with any selected one of said outlet ports of said light propagating channel; and a plurality of optical adder channels, each adder channel having a plurality of inlet ports and an outlet port, each of said inlet ports optically coupled to the other end of said fiber, whereby each adder channel is optically coupled to one fiber from each of said light propagating channels, and said outlet port being adapted to transmit an optical signal from any adder inlet port.

6. An optical cross point switching matrix according to claim 5 in which the first means includes an acousto-optic device for bending the input signal by inducing an optical diffraction grating in said light propagating channel.

7. An optical cross point switching matrix according to claim 6 wherein the acousto-optic device includes a pair of piezoelectric transducers located adjacent said outlet ports.

8. An optical cross point switching matrix according to claim 7 wherein the piezoelectric material is selected from the group consisting of lead-zirconate-titanate, Lithium Niobate and Quartz.

9. An optical cross point switching matrix according to claim 5 wherein the light propagating channel comprises a light conducting film on a supporting substrate.

10. An optical cross point switching matrix according to claim 9 wherein the light conducting film is selected from the group consisting of silicon dioxide, methyl methacrylate, or sputtered glass.

11. An optical cross point switching matrix according to claim 9 wherein the fiber is optically coupled to the light conducting film with a diffraction grating.

* * * * *